United States Patent
Deininger et al.

(10) Patent No.: US 11,840,020 B2
(45) Date of Patent: Dec. 12, 2023

(54) THREE-DIMENSIONAL PRINTED OBJECTS INFUSED WITH ADDITIVE

(71) Applicants: GM GLOBAL TECHNOLOGY OPERATIONS LLC, Detroit, MI (US); eCO2Dye, LLC, Allentown, PA (US)

(72) Inventors: James Joseph Deininger, Sterling Heights, MI (US); Andrew Thomas Cunningham, Cambridge, MA (US); Madhu Anand, Allentown, PA (US); Rolf Schlake, Nazareth, PA (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 0 days.

(21) Appl. No.: 17/654,120

(22) Filed: Mar. 9, 2022

(65) Prior Publication Data

US 2023/0286214 A1    Sep. 14, 2023

(51) Int. Cl.
| | |
|---|---|
| *B29C 64/314* | (2017.01) |
| *B33Y 40/10* | (2020.01) |
| *B33Y 40/20* | (2020.01) |
| *B29C 71/00* | (2006.01) |
| *B29K 77/00* | (2006.01) |
| *B29K 105/00* | (2006.01) |
| *B29L 31/30* | (2006.01) |

(52) U.S. Cl.
CPC ........ *B29C 64/314* (2017.08); *B29C 71/0009* (2013.01); *B33Y 40/10* (2020.01); *B33Y 40/20* (2020.01); *B29C 2071/0018* (2013.01); *B29K 2077/00* (2013.01); *B29K 2105/0032* (2013.01); *B29L 2031/30* (2013.01)

(58) Field of Classification Search
CPC .............. B29C 64/314; B29C 71/0009; B29C 2071/0018; B33Y 40/20; B33Y 40/10; B29K 2207/00; B29K 2105/0032
See application file for complete search history.

(56) References Cited

U.S. PATENT DOCUMENTS

2001/0020311 A1*  9/2001  Veugelers ................ D06P 1/94
8/456

OTHER PUBLICATIONS

"3D Printing with Nylon 618 filament in Tie-Dye colours", RichRap3D, https://richrap.blogspot.com/2013/04/3d-printing-with-nylon-618-filament-in.html; Apr. 11, 2013.*

(Continued)

*Primary Examiner* — James M Mellott
(74) *Attorney, Agent, or Firm* — Lorenz & Kopf LLP (57) ABSTRACT

Methods for forming a function-infused feed material for a three-dimensional printing technique, methods for manufacturing an additive-infused three-dimensional printed object, and vehicles including additive manufactured components are provided. An exemplary method for forming a function-infused feed material for a three-dimensional printing technique includes solubilizing a functional additive into a medium. Further, the method includes contacting a three-dimensional printing feed material with the medium to infuse the functional additive into the three-dimensional printing feed material to form the function-infused feed material.

19 Claims, 8 Drawing Sheets

(56) References Cited

OTHER PUBLICATIONS

Sharifi-Rad et al. "Turmeric and Its Major Compound Curcumin on Health: Bioactive Effects and Safety Profiles for Food, Pharmaceutical, Biotechnological and Medicinal Applications", Front. Pharmacol. Article 01021, published Sep. 2020.*
Niranjan et al., J Food Sci Technol, 2008, 45(2), 109-116.*

* cited by examiner

THREE-DIMENSIONAL PRINTED OBJECTS INFUSED WITH ADDITIVE

INTRODUCTION

The technical field of this disclosure relates generally to three-dimensional printing and, more particularly, to three-dimensional printing of additive-infused three-dimensional objects.

Three-dimensional printing methods have emerged as cost effective alternatives to casting and machining methods. Three-dimensional printing is also known as "layered manufacturing", "laser sintering", "powder sintering", "fused filament fabrication", and "additive manufacturing". For purposes of this disclosure, these terms are all considered synonyms. Basically, three-dimensional printing techniques are based on the concept of building material in a cross-sectional layer-by-layer manner to form a three-dimensional object. Common to three-dimensional printing techniques is the use of three-dimensional modeling software (computer aided design or CAD), machine equipment, and layered materials. Once the CAD sketch is generated, the manufacturing device reads in data from the CAD file and manufactures the three-dimensional part using successive layers from the selected feed material.

Unlike casting processes, three-dimensional printing is not limited by the necessity of providing draft angles, avoiding overhang, etc. Three-dimensional printing also simplifies and reduces costs associated with metal alloy component manufacturing compared to typical casting and machining methods.

In many processing schemes, three-dimensional components formed by three-dimensional printing must undergo additional processing for aesthetic or structural purposes. For example, a three-dimensional printed component may be painted or coated, such as with a colored or functional additive. Alternatively, processes may involve mechanically mixing dye with three-dimensional printing feed material before forming the three-dimensional components.

Thus, while current three-dimensional printing machines and methods achieve their intended purpose, there remains a need for an improved method for forming three-dimensional printed parts that eliminates or reduces the need for further processing. Further, there remains a need for an improved method for forming feed material to support such a method. Furthermore, other desirable features and characteristics will become apparent from the subsequent detailed description and the appended claims, taken in conjunction with the accompanying drawings and the foregoing technical field and background.

SUMMARY

In certain embodiments, a method for forming a function-infused feed material for a three-dimensional printing technique is provided. An exemplary method for forming a function-infused feed material for a three-dimensional printing technique includes solubilizing a functional additive into a medium. Further, the method includes contacting a three-dimensional printing feed material with the medium to infuse the functional additive into the three-dimensional printing feed material to form the function-infused feed material.

In certain embodiments of the method, solubilizing a functional additive into a medium includes solubilizing a functional additive into a medium in a liquid state. In further certain embodiments of the method, contacting a three-dimensional printing feed material with the medium to infuse the functional additive into the three-dimensional printing feed material includes contacting a three-dimensional printing feed material with the medium in the liquid state to infuse the functional additive into the three-dimensional printing feed material to form the function-infused feed material.

In certain embodiments of the method, solubilizing a functional additive into a medium includes solubilizing a functional additive into a medium in a supercritical fluid state; and contacting a three-dimensional printing feed material with the medium to infuse the functional additive into the three-dimensional printing feed material includes contacting a three-dimensional printing feed material with the medium in the supercritical fluid state to infuse the functional additive into the three-dimensional printing feed material to form the functional additive-infused feed material. In such embodiments, the method may include locating the functional additive in a chamber; locating the three-dimensional printing feed material in the chamber; feeding the medium into the chamber; maintaining conditions in the chamber such that the medium is in supercritical fluid state; solubilizing the functional additive in the medium in the supercritical fluid state; circulating the medium in the supercritical fluid state within the chamber; diffusing the functional additive from the medium in the supercritical fluid state into the three-dimensional printing feed material; and modifying conditions in the chamber, such as by depressurizing the chamber.

In certain embodiments, the medium in the supercritical fluid state is supercritical carbon dioxide and, optionally, a co-solvent. Exemplary co-solvents may be selected from polar solvents, such as alcohols.

In certain embodiments of the method, the functional additive is selected from silicones, photoinitiators, cyanate esters, cross linkers, monomers, oligomers, polymers, adhesives, esters, aromatic compounds, photochromic materials, electrochromic materials, silicones, acrylates, methacrylates, ultraviolet (UV) scavengers, organometallics, solvents, photoactive resins, antioxidants, stabilizers, catalysts, rheology modifiers, and/or surface modifiers.

In certain embodiments of the method, the three-dimensional printing feed material is polyamide.

In certain embodiments of the method, the function-infused feed material has a functional additive concentration of less than about 10 weight percent (wt. %), based on a total weight of the function-infused feed material.

In another embodiment, a method for manufacturing an additive-infused three-dimensional printed object is provided. The method includes solubilizing an additive into a medium. Further, the method includes contacting a three-dimensional printed object with the medium to infuse the additive into the three-dimensional printed object to form the additive-infused three-dimensional printed object.

In certain embodiments of the method, solubilizing an additive into a medium includes solubilizing an additive into a medium in a liquid or a supercritical fluid state; and contacting a three-dimensional printed object with the medium to infuse the additive into the three-dimensional printed object to form the additive-infused three-dimensional printed object includes contacting a three-dimensional printed object with the medium in the liquid or the supercritical fluid state.

In certain embodiments of the method, the additive is a functional additive selected from silicones, photoinitiators, cyanate esters, cross linkers, monomers, oligomers, polymers, adhesives, esters, aromatic compounds, photochromic materials, electrochromic materials, silicones, acrylates, methacrylates, ultraviolet (UV) scavengers, organometallics, solvents, photoactive resins, antioxidants, stabilizers, catalysts, rheology modifiers, and surface modifiers. In certain embodiments of the method, the additive is a dye.

In certain embodiments of the method, the three-dimensional printed object is formed from polyamide.

In certain embodiments of the method, solubilizing an additive into a medium and contacting a three-dimensional printed object with the medium to infuse the additive into the three-dimensional printed object to form the additive-infused three-dimensional printed object includes: locating the additive in a chamber; locating the three-dimensional printed object in the chamber; feeding the medium into the chamber; maintaining conditions in the chamber such that the medium is in supercritical fluid state; solubilizing the additive in the medium in the supercritical fluid state; and circulating the medium in the supercritical fluid state within the chamber; diffusing the additive from the medium in the supercritical fluid state into the three-dimensional printed object; and modifying conditions in the chamber such that the medium converts to gas during depressurizing, for example by removing the medium.

In certain embodiments of the method, maintaining conditions in the chamber such that the medium is in supercritical fluid state includes pressurizing or pressurizing and heating the fluid to supercritical conditions. In certain embodiments of the method, the chamber is depressurized to atmospheric pressure at the end of the infusion step by removing the fluid from the chamber such that the medium changes from the supercritical fluid state to a gaseous state at atmospheric pressure and the method further includes removing the additive-infused three-dimensional printed object from the chamber after depressurization of the chamber.

In certain embodiments of the method, the supercritical fluid state is supercritical carbon dioxide.

In certain embodiments of the method, the additive-infused three-dimensional printed object has an additive concentration of less than about 10 wt. %, based on a total weight of the additive-infused three-dimensional printed object.

In certain embodiments of the method, the additive-infused three-dimensional printed object has a first additive concentration of a first additive, and the method further includes processing the additive-infused three-dimensional printed object with a second infusion process to form the additive-infused three-dimensional printed object with a second additive, different from the first additive, and at a second additive concentration.

In another embodiment, a vehicle is provided. The vehicle includes an additive-infused vehicle component manufactured using a three-dimensional printing technique.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to three-dimensional printing, such as to three-dimensional printing of function-infused objects. Embodiments herein provide for forming function-infused three-dimensional printing feed material, such as in the form of powder or particulate or in the form of filament. Embodiments herein provide for manufacturing a function-infused three-dimensional printed object from the function-infused three-dimensional printing feed material. Also, embodiments herein provide for infusing three-dimensional printed objects with an additive.

More specifically, embodiments herein provide for infusing an additive, such as a dye or a functional additive into three-dimensional printing feed material or three-dimensional printed objects through the use of a medium. The medium may be provided in the form of a liquid or in the form of a supercritical fluid. As used herein, "supercritical fluid" means a material that is neither liquid nor gas and that is at, or at a temperature higher than, the "critical temperature" of the material and at, or at a pressure higher than, the "critical pressure" of the material. In such conditions, the properties of the supercritical fluid are partially analogous to those of a liquid (for example, the density) and partially similar to those of a gas (for example, the viscosity or diffusivity). For example, supercritical carbon dioxide is typically above the critical temperature of 31° C. (304.13 K, 87.8° F.) and the critical pressure of 72.8 atm (7.3773 MPa, 1,070 psi, 73.8 bar).

As used herein, "function-infused" means that a functional additive is infused into the material. As used herein, "functional additive" means a material, other than a dye such as a colorant, that modifies the chemical, physical, mechanical, electrical, or other functional properties of the three-dimensional printing feed material or three-dimensional printed object in a desired manner. For example, a functional additive may include a material such as silicones, acrylates, photoinitiators, cyanate esters, cross linkers that can change the mechanical properties (tensile, elongation, impact) or conductivity of a feed material or object; monomers, oligomers, polymers, and/or adhesives to create a hydrophobic or watertight feed material or part; esters or aromatic compounds to form the feed material or object with a selected odor; photochromic materials (liquid crystals) or electrochromic materials (conjugated polymers) that change color based on temperature or electricity for temperature or electrical monitoring, to provide the feed material or object with color change capability; or chemical additives, such as silicones, acrylates, methacrylate, photoinitiations, ultraviolet (UV) scavengers, organometallics, solvents, cyanate esters, oligomers, polymers, photoactive resins, antioxidants, stabilizers, catalysts, cross linkers, rheology modifiers, and surface modifiers, to change mechanical, electrical, optical, or other critical properties of the feed material or object.

In certain embodiments, the functional additive includes organometallic complexes based on silver and/or copper, such that after forming the function-infused printed object a heat treatment or reduction (example with hydrogen gas) may be performed to convert the organometallic to a metallic form.

In certain embodiments, the functional additive includes electrochromic compounds like organic LED active compounds such that the function-infused printed object may fluoresce or glow under ultraviolet (UV) light or under other selected conditions.

In certain embodiments, the functional additive is hydrophobic such that the function-infused printed object is watertight and/or has a hydrophobic surface.

In certain embodiments, the functional additive is thermochromic, such as liquid crystals, to provide the function-infused printed object with the ability to change color based on temperature, such as for temperature monitoring applications.

In certain embodiments, the functional additive includes UV active compounds that emit photons under UV-light, such that the function-infused printed object may emit photons under UV-light for identification, authentication, security, tracking, or ascetics.

In certain embodiments, multiple functional additives can be infused into the feed material and/or printed object to enhance the final properties of the printed object.

As used herein, "additive-infused" means that an additive is infused into the material. As used herein, "additive" means a material, including a dye such as a colorant and/or a functional additive, as described above, that alters the physical, optical or visual, or chemical properties of the three-dimensional printed object in a desired manner. In certain embodiments, a combination of dye and one or more functional additives can be infused into the feed material and/or printed object to enhance the final properties of the printed object.

While exemplary embodiments include infusing functional additive(s) and/or dye(s) into polyamide, it is contemplated that process conditions can be optimized to infuse a wide range of additives into a wide range of materials.

Currently, three-dimensional printed objects are generally post-processed using coating, vapor smoothing, or polishing to change the properties of the printed object. Certain embodiments herein allow for the infusion or coating (surface treatment as mentioned earlier) of a wide range of functional additives into three-dimensional printed object. Furthermore, it is contemplated that a wide range of chemistries that cannot currently be utilized in post-processing may be used in the methods described herein.

Additionally, embodiments herein are not limited to the treatment of the surface of objects. Rather, additives may be infused deep into printed object or feed material, such as completely throughout printed objects or feed material.

Figure 1:
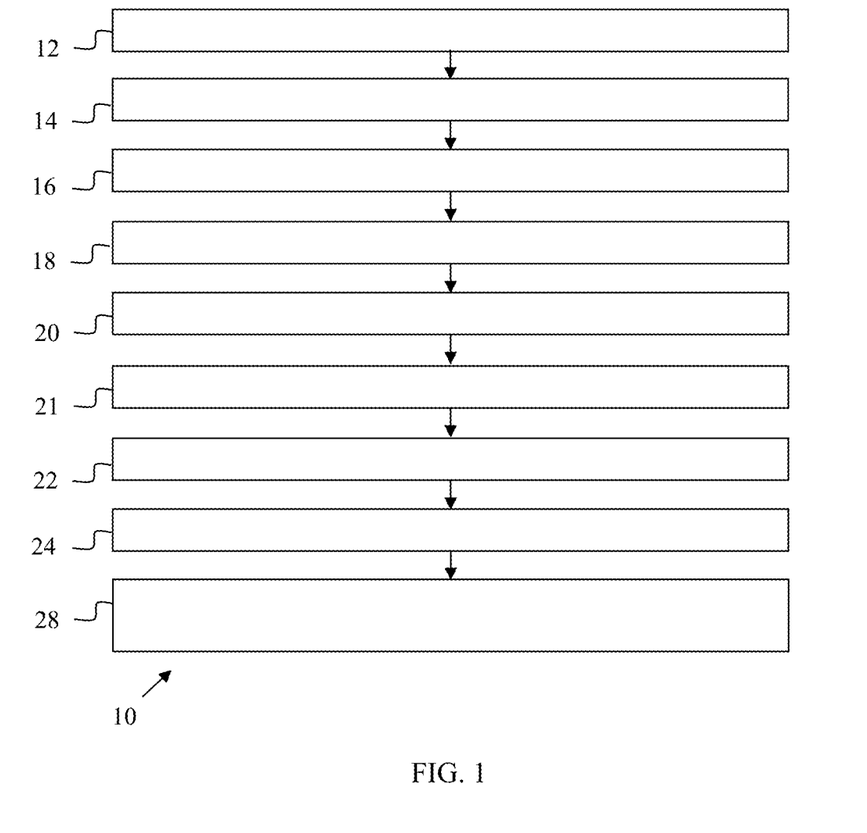
FIG. 1 is a flow chart illustration of a method for forming a function-infused feed material, in accordance with various embodiments.
Figure 2:
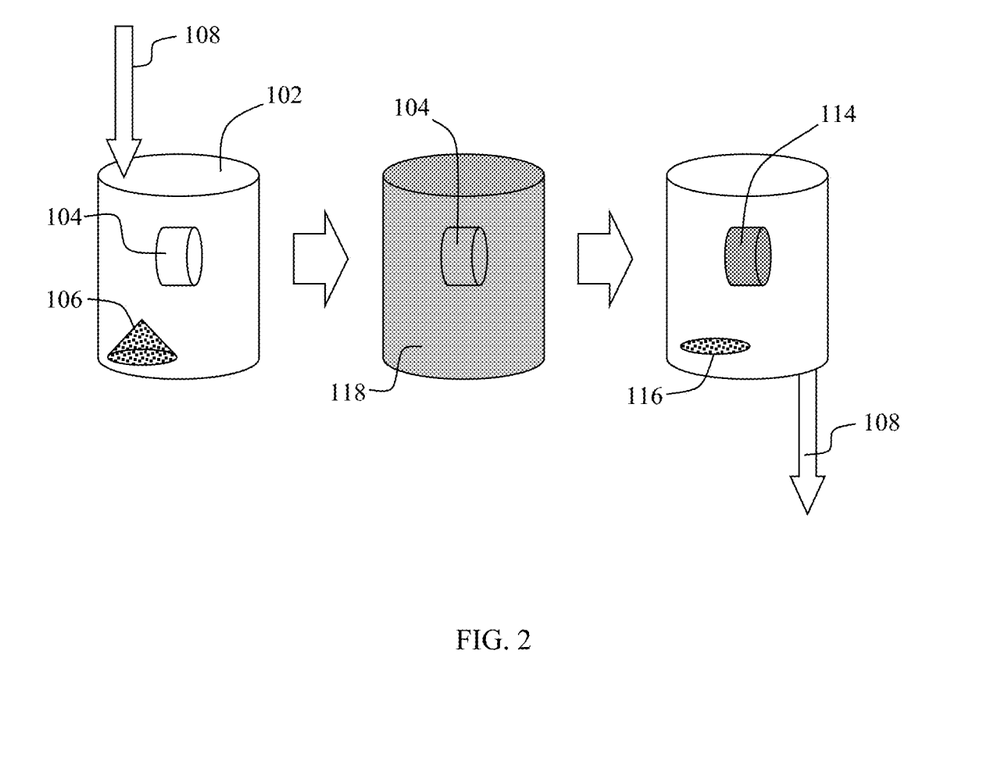
FIG. 2 is a schematic of a method for forming a function-infused feed material, in accordance with various embodiments.

Referring now to FIGS. 1 and 2, a method 10 is described for forming a function-infused three-dimensional printing feed material 114. The method 10 includes, at operation 12, locating a three-dimensional printing feed material 104 in a chamber 102. An exemplary three-dimensional printing feed material 104 is in the form of powder or particulate, or in the form of a filament (as shown in FIG. 2) or filaments. An exemplary three-dimensional printing feed material 104 has a particulate average diameter or filament diameter of less than 3 millimeters (mm), such as less than 2.5 mm, less than 2 mm, less than 1.75 mm, less than 1.5 mm, less than 1.25 mm, less than 1 mm, less than 0.75 mm, or less than 0.5 mm. An exemplary three-dimensional printing feed material 104 has a particulate average diameter or filament diameter of at least 0.5 mm, such as at least 0.75 mm, at least 1 mm, at least 1.25 mm, at least 1.5 mm, at least 1.75 mm, at least 2 mm, at least 2.25 mm, at least 2.5 mm, or at least 2.75 mm.

For three-dimensional printing feed material 104 in the form of a filament, the three-dimensional printing feed material may be wound (as shown in FIG. 2), or wound on a spool. The spool may also be located in the chamber 102. In exemplary embodiments, the spool is made from a material that is suitable for use with a supercritical fluid, such as for example metal such as steel or aluminum or plastic such as polypropylene).

An exemplary feed material is a plastic, such as polyamide. Other possible feed materials include ABS (acrylonitrile butadiene styrene), PLA (polylactic acid), PEI (polyethylenimine) (or polyetherimide), PPSU (polyphenylsulfone), PEEK (polyether ether ketone), etc., as well as ceramics.

Further, the method 10 includes, at operation 14, locating a functional additive 106 in the chamber. Any suitable functional additive that may be solubilized by, or dissolved in, the medium described below may be used. Exemplary functional additives may include organic functional additives. In certain embodiments, the functional additive 106 may be selected from silicones, acrylates, photoinitiators, cyanate esters, cross linkers, monomers, oligomers, polymers, adhesives, esters, aromatic compounds, photochromic materials, electrochromic materials, silicones, acrylates, methacrylates, ultraviolet (UV) scavengers, organometallics, solvents, cyanate esters, photoactive resins, antioxidants, stabilizers, catalysts, rheology modifiers, and surface modifiers, or as otherwise is described above.

In exemplary embodiments, the functional additive 106 is a solid when located in the chamber.

As shown in FIG. 1, the method 10 further includes, at operation 16, feeding a medium 108 into the chamber 102. In exemplary embodiments, the medium 108 is a liquid when fed into the chamber 102. An exemplary medium 108 is carbon dioxide ($CO_2$) though other suitable compounds may be used. For example, typical gases that are useable as supercritical fluids include methane, ammonia, and $N_2$. Methane and ammonia are hazardous. $N_2$ supercritical condition require low temperatures. Energy use will also be greater with $N_2$ because of the low temperature. Thus, $CO_2$ is a practical and safe molecule to use as the medium.

Further, the medium 108 may further include a co-solvent. Exemplary co-solvents may be selected from polar solvents, such as alcohols. The co-solvent content may typically range from 0.1% to 10% of the amount of CO2.

In exemplary embodiments, the chamber 102 is filled with the medium 108 such that substantially all of any ambient fluid, such as air, is removed from chamber 102.

In certain embodiments, the method 10 includes, at operation 18, sealing the chamber 102 and maintaining the conditions in the chamber 102. Specifically, the chamber 102 may be pressurized with the medium and/or pressurized and heated. For example, in certain embodiments, the chamber 102 is pressurized to a pressure of at least 72.8 atm (7.3773 MPa, 1,070 psi, 73.8 bar), such as at least 75 atm, at least 100 atm, at least 125 atm, at least 150 atm, or at least 200 atm. In certain embodiments, the chamber 102 is pressurized to a pressure of no more than 700 atm, such as no more than 500 atm, no more than 400 atm, no more than 300 atm, no more than 275 atm, no more than 250 atm, no more than 225 atm, or no more than 200 atm. In certain embodiments, the chamber 102 is pressurized to a pressure of from 75 to 700 atm, such as from 125 to 275 atm, for example about 200 atm.

Further, in certain examples, the chamber 102 may be heated to a temperature of at least 31° C., such as at least 40° C., at least 50° C., at least 75° C., at least 90° C., at least 100° C., or at least 120° C., and a temperature of no more than 200° C., such as no more than 150° C., no more than 120° C., or no more than 100° C. In exemplary embodiments, the chamber 102 is heated to a temperature of from 40 to 200° C., such as from 75 to 150° C., for example from 100 to 120° C.

As a result of the modified conditions in the chamber 102, in an exemplary embodiment, the medium 108 is maintained at the supercritical state, i.e., the medium is a supercritical fluid 118.

The method 10 further includes, at operation 20, solubilizing the functional additive 106 in the medium in the form of the supercritical fluid 118. The functional additive 106 may solubilize in the supercritical fluid 118 within moments of changing the state of the medium to the supercritical state. When solubilized, the functional additive 106 is dissolved into the supercritical fluid 118.

The method 10 may include, at operation 21, circulating the medium within the chamber 102. Circulation of the medium may accelerate solubilization of the function additive 106 in the medium and/or diffusion of the functional additive 106 into the feed material at operation 22 below. Thus, the method 10 may circulate the medium within the chamber 102 before and/or concurrent with preceding operation 20 as well as succeeding operation 22.

The method 10 includes, at operation 22, diffusing the functional additive 106 into the feed material 104 to form a function-infused three-dimensional printing feed material 114. Typically, the functional additive 106 diffuses into the feed material 104 within minutes.

In an exemplary embodiment, the additive 106 diffuses into the feed material 104 in a duration of no more than 500 minutes, such as no more than 400 minutes, no more than 300 minutes, no more than 200 minutes, no more than 150 minutes, no more than 120 minutes, no more than ninety minutes, no more than sixty minutes, no more than thirty minutes, no more than fifteen minutes, or no more than five minutes. In exemplary embodiments, the additive 106 diffuses into the feed material 104 in a duration of at least one minute, such as at least five minutes, at least ten minutes, at least fifteen minutes, at least thirty minutes, at least forty minutes, at least sixty minutes, at least ninety minutes, or at least 120 minutes. In certain embodiments, the additive 106 diffuses into the feed material 104 in a duration of from one minute to 500 minutes, such as from fifteen to 120 minutes, for example from thirty to sixty minutes, depending on the size of the particle or filament of feed material 104 and the depth of penetration of the infusion molecule desired. It is contemplated that increasing the pressure and/or temperature of the chamber 102 may decrease the duration of time needed to diffuse into the feed material 104.

In certain embodiments, the functional additive 106 diffuses into the feed material 104 completely, such that a cross-section of the functional additive-diffused three-dimensional printing feed material 114 would exhibit a uniform amount of functional additive 106 infused at all distances from the feed material surface. In other embodiments, operation 22 may be performed at conditions and for a duration such that the functional additive 106 diffuses only partway into each feed material element (particle or filament), i.e., to a certain depth from a surface of the feed material 104.

In exemplary embodiments, after diffusing the functional additive 106 into the feed material 104, the function-infused three-dimensional printing feed material 114 has a functional additive concentration that is no more than 5 weight percent (wt. %), such as no more than 4.5 wt. %, 4 wt. %, 3.5 wt. %, 3 wt. %, 2.5 wt. %, 2 wt. %, 1.5 wt. %, 1 wt. %, 0.5 wt. %, or 0.1 wt. %, based on a total weight of the feed material, depending on the functionality being achieved.

In exemplary embodiments, after diffusing the functional additive 106 into the feed material 104, the function-infused three-dimensional printing feed material 114 has a functional additive concentration that is at least 0.01 wt. %, such as at least 0.1 wt. %, 0.5 wt. %, 1 wt. %, 1.5 wt. %, 2 wt. %, 2.5 wt. %, 3 wt. %, 3.5 wt. %, 4 wt. %, 4.5 wt. %, or 5 wt. %, based on a total weight of the feed material, depending on the functionality being achieved.

It may be seen from FIGS. 1 and 2, that locating the feed material 104 and the functional additive 106 in the chamber 102, feeding the medium 108 into the chamber 102, maintaining conditions in the chamber such that the medium is in supercritical fluid state, and solubilizing the functional additive 106 into the supercritical fluid 118 collectively cause contact of the feed material with the medium in the form of a supercritical fluid to infuse the functional additive into the feed material 104 to form function-infused three-dimensional printing feed material 114.

At operation 24, the method returns the chamber 102 to atmospheric conditions, such as by de-pressurizing the chamber 102. In certain embodiments, at operation 24, the method removes the medium 108 from the chamber 102. Removing medium 108 from the chamber causes de-pressurization of the chamber.

For example, if operating at 200 atm and 100° C., at the end of the infusion step, the fluid in the chamber is depressurized by removing the medium from the chamber (e.g., by venting from the chamber; as the pressure decreases in the chamber and goes below the critical pressure, the supercritical fluid becomes a gas. Depressurization of the chamber continues by venting or recycling of the medium until the pressure is back to atmospheric at which point the chamber is opened and the part removed.

The method 10 includes, at operation 28, removing the function-infused three-dimensional printing feed material 114 and any remaining functional additive 116 from the chamber 102. Thereafter, the function-infused three-dimensional printing feed material may be stored or may be transported for use in three-dimensional printing.

Thus method 10 forms a function-infused three-dimensional printing feed material 114, such that a three-dimensional printing technique utilizing such feed material manufactures a function-infused three-dimensional object with pre-selected functional characteristics. Such a manufacturing process may eliminate a need for further processing to obtain such functional characteristics.

It is noted that in the above method 10 described in relation to FIGS. 1-2, the medium is brought to supercritical conditions at operation 18 and returned to atmospheric conditions at operation 24. In certain embodiments, operations 18 and 24 may be performed differently or be optional. Specifically, in certain embodiments, the medium remains at non-critical conditions—for example, in a liquid state. In such embodiments, the medium is fed into the chamber at operation 16, and the chamber may be sealed at operation 18. In certain embodiments, the conditions in the chamber may be modified, such as heated to a selected temperature, at operation 18. However, in such embodiments, the liquid medium remains in the liquid state. Thereafter, the method 10 continues with the same operations 20, 21, and 22.

In an exemplary embodiment, the medium is $CO_2$, which remains a liquid at many pressures as long as the temperature in the chamber is below the critical temperature, i.e., 31° C. In an exemplary embodiment, the operating parameters of treating in liquid $CO_2$ is 20° C. and 80 atm. At the end of infusion step, the liquid $CO_2$ is removed by depressurization as in the case of supercritical $CO_2$. Pressure is reduced by venting the $CO_2$ or by pumping the liquid $CO_2$ into another vessel for recycle or reuse. The chamber pressure decreases as the $CO_2$ is removed. This process is continued until atmospheric pressure is reached. Then the vessel may be opened to remove the treated part.

Thus, method 10 may be performed with a liquid medium, rather than a medium in a supercritical state.

Figure 3:
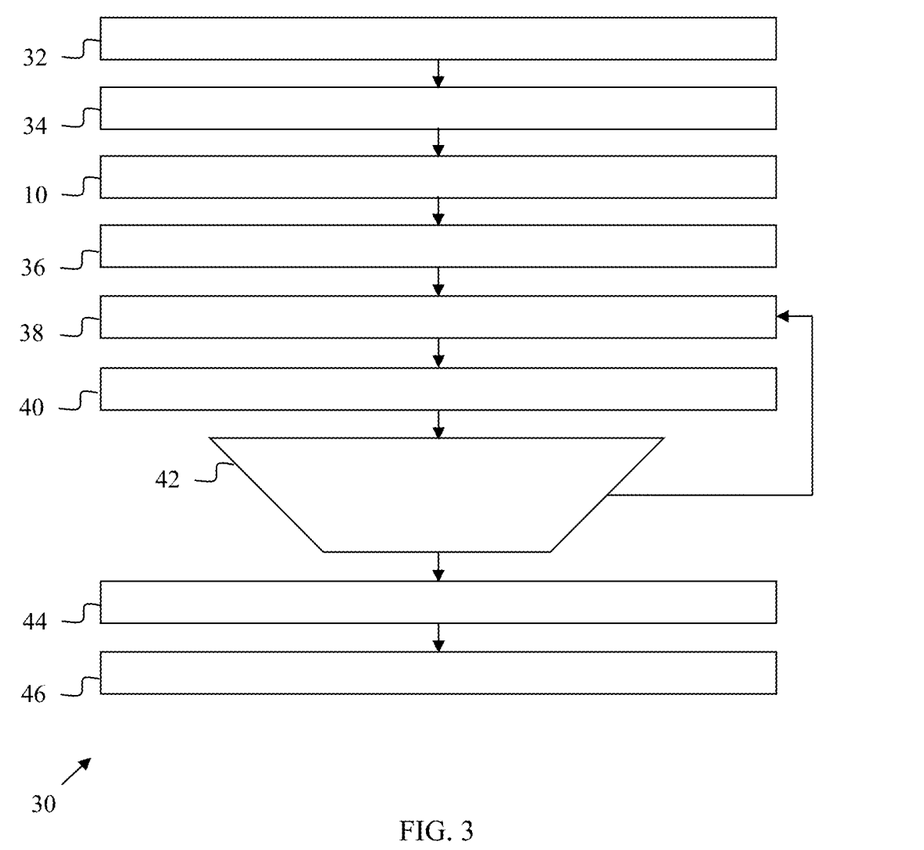
FIG. 3 is a flow chart illustration of a method for manufacturing a three-dimensional object using a three-dimensional printing technique, in accordance with various embodiments.
Figure 4:
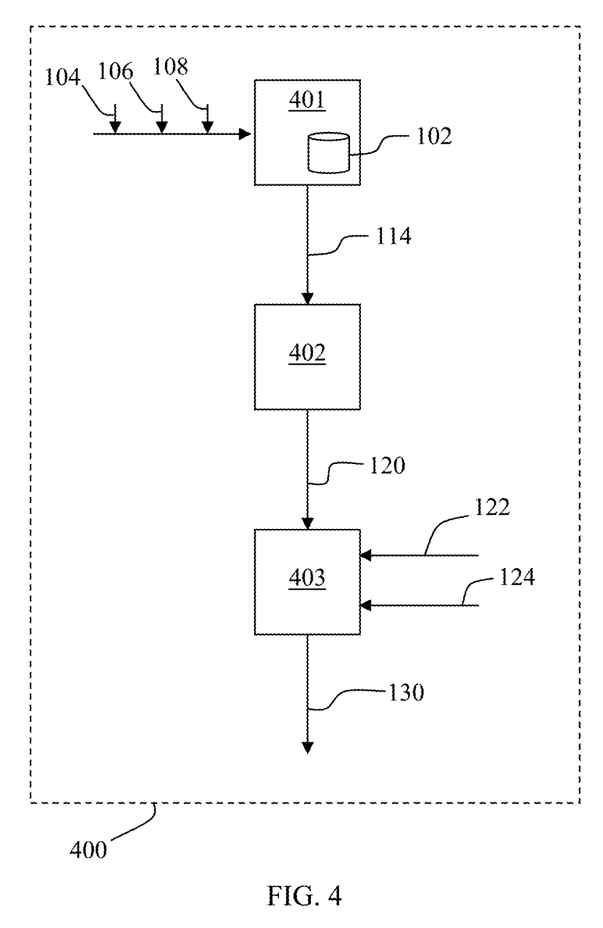
FIG. 4 is a schematic of a method for manufacturing a three-dimensional object using a three-dimensional printing technique, in accordance with various embodiments.

Referring now to FIGS. 3 and 4, a method 30 is described for manufacturing a function-infused three-dimensional object 120 using a three-dimensional printing technique. As shown, method 30 includes method 10, from FIG. 1, for forming a function-infused feed material 114. For example, method 30 includes solubilizing a functional additive 106 into a medium 108 in the form of a supercritical fluid 118 and contacting a feed material 104 with the medium in the form of a supercritical fluid 118 to infuse the functional additive 106 into the feed material 104 to form function-infused feed material 114.

In exemplary embodiments, the inputs used in method 10, e.g., the feed material 104, the functional additive 106, and the medium 108, are stored in the manufacturing plant 400 at operation 32 of method 30. More specifically, a plurality of feed materials with selected compositions, shapes, sizes, etc. may be stored in the manufacturing plant 400 such that a desired feed material 104 may be selected for use in method 10 at a particular time. Likewise, a plurality of functional additives with selected compositions and colors may be stored in the manufacturing plant 400 such that a desired functional additive may be selected for use in method 10 at a particular time. Also, a plurality of mediums 108, a plurality of mediums or media of selected compositions may be stored in the manufacturing plant 400 such that a desired medium may be selected for use in method 10 at a particular time.

As shown, chamber 102 is located within first work station 401. Chamber 102 may be permanently located in first work station 401, or may be transported into and out of first work station 401.

At operation 34, method 30 selects inputs and transports the selected inputs to first work station 401. Selection and/or selection and transport may be automated and performed by a processor and robot. In first work station 401, method 10 is performed to form the function-infused feed material 114 as described above.

After forming the function-infused feed material 114, method 30 may include, at operation 36, transporting the function-infused feed material 114 from the first work station 401 to a second work station 402 within the same manufacturing plant 400. In exemplary embodiments, a cart or pod may be used robotically or manually to carry the function-infused feed material 114 from the first work station 401 to the second work station 402.

At operation 38 and in second work station 402, the method 30 melts the function-infused feed material 114, such as in a three-dimensional printing process. Further, at operation 40 and in second work station 402, the method 30 solidifies the melted function-infused feed material into a solid layer, such as by cooling the melted function-infused feed material into a solid layer.

Method 30 contemplates different scenarios for the performance of operations 38 and 40, depending on the three-dimensional printing technique used. Generally, operation 38 includes locally melting the function-infused feed material 114 in selected regions of a layer corresponding to a cross-section of a three-dimensional object being formed and operation 40 includes solidifying the function-infused feed material into a solid layer of function-infused material. In certain embodiments, a portion of the function-infused feed material 114 may be arranged in a layer of a three-dimensional object to be formed, and the layer may be heated to melt and form a melted pool. Then the melted pool may be solidified, such as by cooling or by ceasing the melting process to form a layer of the object to be formed. In other embodiments, portions of the function-infused feed material may be continuously melted and cooled to form a layer of the object to be formed. Thus, operations 38 and 40 may be performed in series or continuously as indicated by the three-dimensional printing technique used.

At query 42, the method 30 queries whether the function-infused three-dimensional object 120 is complete. If not, the method 30 continues with operation 38. Thus, operations 38 and 40 are repeated to form the function-infused three-dimensional object 120 made up of a plurality of solid layers of function-infused material. When query 42 determines that the function-infused three-dimensional object 120 is complete, then the method 30 continues with, at operation 44, transporting the function-infused three-dimensional object 120 out of the second station 402. For example, the function-infused three-dimensional object 120 may be transported from the second work station 402 to a third work station 403 within the same manufacturing plant 400. In exemplary embodiments, a cart or pod may be used robotically or manually to carry the function-infused three-dimensional object 120 from the second work station 402 to the third work station 403.

In certain embodiments, the function-infused three-dimensional object 120 is an automotive vehicle part. Method 30 may include, at operation 46, assembling the function-infused three-dimensional object 120 into a vehicle. For example, the function-infused three-dimensional object 120 may be assembled with other function-infused three-dimensional objects 122 or with other parts 124 to form an assembly 130 for the vehicle.

Method 30 provides for manufacturing a three-dimensional object that is function-infused such that the object has a consistent profile of functional additive dispersed throughout the three-dimensional object.

In exemplary embodiments, the function-infused three-dimensional object 122 has a functional additive concentration that is no more than 10 weight percent (wt. %), such as no more than 5 wt. %, 4.5 wt. %, 4 wt. %, 3.5 wt. %, 3 wt. %, 2.5 wt. %, 2 wt. %, 1.5 wt. %, 1 wt. %, 0.5 wt. %, or 0.1 wt. %, based on a total weight of the feed material, depending on the functionality being achieved.

In exemplary embodiments, the function-infused three-dimensional object 122 has a functional additive concentration that is at least 0.01 wt. %, such as at least 0.1 wt. %, 0.5 wt. %, 1 wt. %, 1.5 wt. %, 2 wt. %, 2.5 wt. %, 3 wt. %, 3.5 wt. %, 4 wt. %, 4.5 wt. %, 5 wt. % or 10 wt. %, based on a total weight of the feed material, depending on the functionality being achieved.

Figure 5:
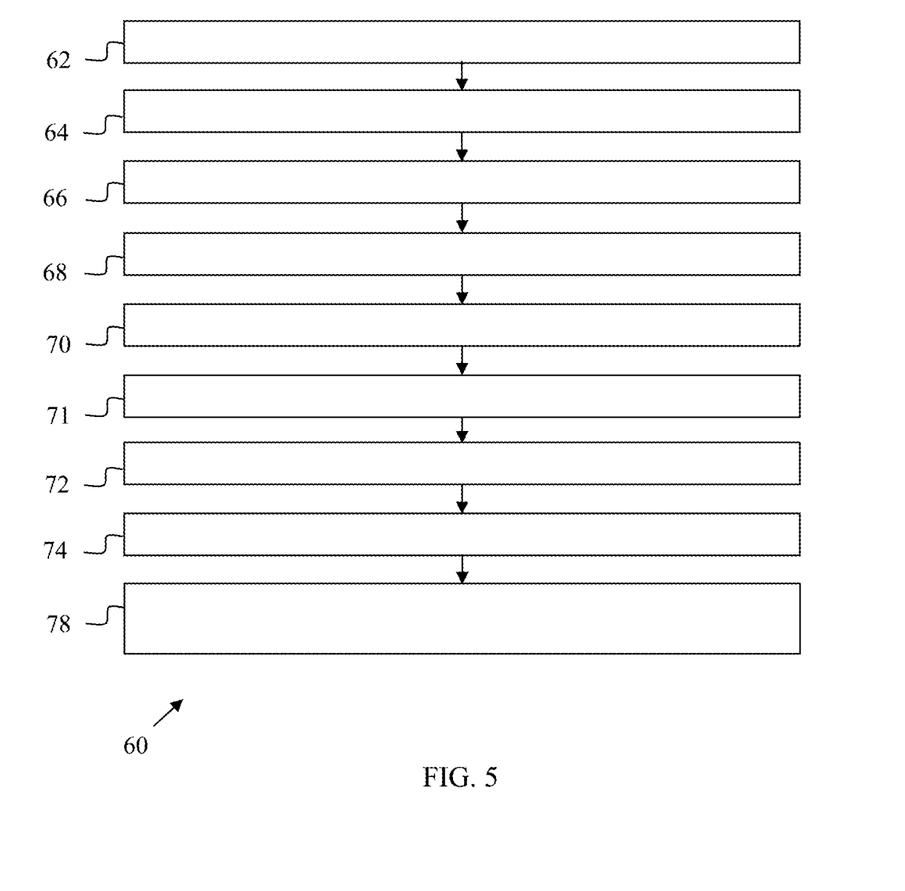
FIG. 5 is a flow chart illustration of a method for manufacturing an additive-infused three-dimensional object, in accordance with various embodiments.
Figure 6:
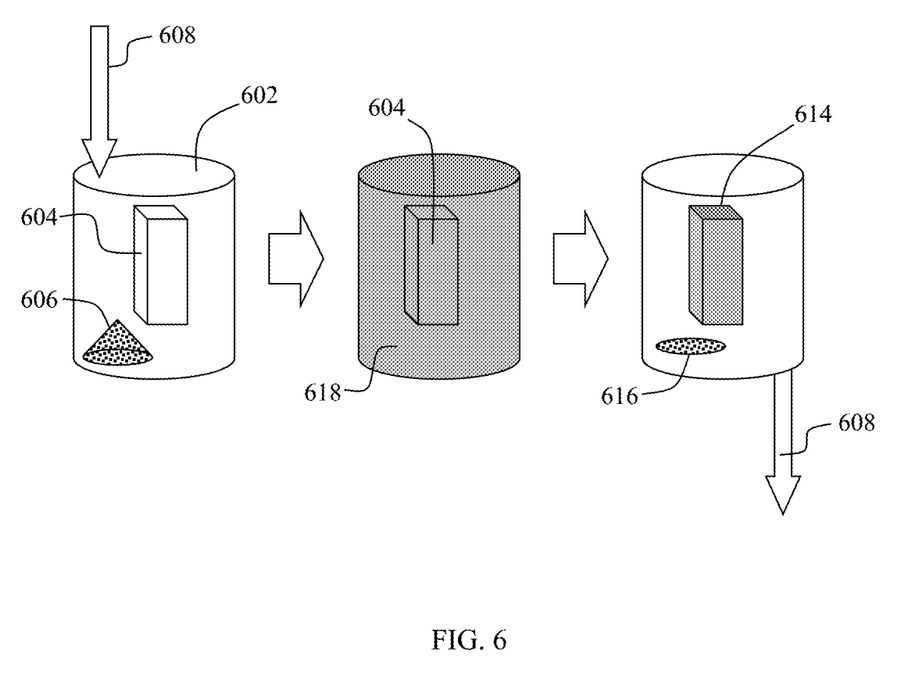
FIG. 6 is a schematic of a method for manufacturing an additive-infused three-dimensional printed object, in accordance with various embodiments.

Referring now to FIGS. 5 and 6, a method 60 is described for forming an additive-infused three-dimensional printed object 614. The method 60 includes, at operation 62, locating a three-dimensional printed object 604 in a chamber 602. An exemplary three-dimensional printed object 604 has a maximum thickness or critical dimension of less than 10 centimeters (cm), such as less than 8 cm mm, less than 6 cm, less than 5 cm, less than 4 cm, less than 3 cm, less than 1 cm, less than 0.5 cm, or less than 0.25 cm. An exemplary three-dimensional printed object 604 has a maximum thickness or critical dimension of at least 0.25 cm, such as at least 0.5 cm, at least 1 cm, at least 2 cm, at least 3 cm, at least 4 cm, at least 5 cm, at least 6 cm, at least 8 cm, or at least 10 cm.

In exemplary embodiments, three-dimensional printed object 604 is a plastic, such as polyamide. Other possible materials forming the three-dimensional printed object 604 include ABS (acrylonitrile butadiene styrene), PLA (polylactic acid), PEI (polyethylenimine) or (polyetherimide), PPSU (polyphenylsulfone), PEEK (polyether ether ketone), etc., as well as ceramics.

Further, the method 60 includes, at operation 64, locating an additive 606 in the chamber. As disclosed above, the additive may be a dye, including colorants, or a functional additive. Any suitable dye that may be solubilized by, or dissolved in, the supercritical medium described below may be used. Exemplary dyes may include organic dyes. In certain embodiments, the dye may be selected from organic dyes such as coumarin 460 (blue), coumarin 6 (green), Nile red or the like; lanthanide complexes; hydrocarbon and substituted hydrocarbon dyes; polycyclic aromatic hydrocarbons; scintillation dyes (preferably oxazoles and oxadiazoles); aryl or heteroaryl substituted poly (2-8 olefins); carbocyanine dyes; dyes based on phthalocyanine; oxazine dyes; carbostyril dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethylimino-benzo (a) phenoxazonium perchlorate; 7-amino-4-methylcarbostyryl; 7-amino-4-methylcoumarin; 3-(2-benzimidazolyl)-7-N, N-diethylaminocoumarin; 3-(2-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4-bis-(2-butyloctyloxy)-p-quaterphenyl; p-bis (o-methylstyryl)-benzene; 5,9-diaminobenzo (a) phenoxazonium perchlorate; 4-dicyanomethylene-2-methyl-6-(p-dimethylaminostyryl)-4H-pyran; 1,1-diethyl-2,2-carbocyanine iodide; 3,3-diethyl-4,4,5,5-dibenzothiatricarbocyanine iodide; 7-diethylamino-4-methylcoumarin; 7-diethylamino-4-trifluoromethylcoumarin; 2,2-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; the red of the Nile; rhodamine 700; oxazine 750; rhodamine 800; IR 125; IR 144; IR 140; IR 132; IR 26; IR 5; diphenylhexatriene; diphenylbutadiene; tetraphenylbutadiene; mothballs; anthracene; 9,10-diphenylanthracene; pyrene; chrysene; rubrene; coronene; phenanthrene or the like, or combinations including at least one of the foregoing dyes.

The additive 606 may be or include any of the functional additives described above.

In exemplary embodiments, the additive 606 is a solid when located in the chamber.

As shown in FIG. 5, the method 60 further includes, at operation 66, feeding a medium 608 into the chamber 602. In exemplary embodiments, the medium 608 is a liquid or in supercritical state when fed into the chamber 602. An exemplary medium 608 is carbon dioxide ($CO_2$) though other suitable compounds may be used.

In exemplary embodiments, the chamber 602 is filled with the medium 608 such that substantially all of any ambient fluid, such as air, is removed from chamber 602.

The method 60 includes, at operation 68, sealing the chamber 602 and maintaining conditions in the chamber such that the medium is in supercritical fluid state. Specifically, the chamber 602 may be pressurized and/or pressurized and heated. For example, in certain embodiments, the chamber 602 is pressurized with the medium, such as $CO_2$, to a pressure of at least 72.8 atm (7.3773 MPa, 1,070 psi, 73.8 bar), such as at least 75, at least 100, at least 125 atm, at least 150 atm, or at least 200 atm. In certain embodiments, the chamber 602 is pressurized to a pressure of no more than 700 atm, such as no more than 500 atm, no more than 400 atm, no more than 300 atm, no more than 275 atm, no more than 250 atm, no more than 225 atm, or no more than 200 atm. In certain embodiments, the chamber 602 is pressurized to a pressure of from 75 to 700 atm, such as from 125 to 275 atm, for example about 200 atm.

Further, in certain examples, the chamber 602 may be heated to a temperature of at least 31° C., such as at least 40° C., at least 50° C., at least 75° C., at least 90° C., at least 100° C., or at least 120° C., and a temperature of no more than 200° C., such as no more than 150° C., no more than 120° C., or no more than 100° C. In exemplary embodiments, the chamber 602 is heated to a temperature of from 40 to 200° C., such as from 75 to 150° C., for example from 100 to 120° C.

In a typical process, a liquid medium, such as liquid $CO_2$, from a storage tank (for example, at a pressure of about 60 bar) is pressurized to a pressure of about 200 bar (or to the desired pressure in the chamber) using a liquid pump. The liquid medium at the elevated pressure is heated, using a heater, close to the desired temperature (for example to about 100° C.) and then conveyed into the preheated chamber. Thus, in this process, the medium is already in a supercritical state when it enters the chamber. In other embodiments, liquid medium may be pumped into a pre-heated chamber and the heat from the chamber converts the liquid into the supercritical state.

The method 60 further includes, at operation 70, solubilizing the additive 606 in the medium in the form of the supercritical fluid 618. The additive 606 may solubilize in the supercritical fluid 618 within moments. When solubilized, the additive 606 is dissolved into the supercritical fluid 618 and equally dispersed throughout the volume of the chamber 602, as facilitated by agitation in the vessel.

The method 60 may include, at operation 71, circulating the medium within the chamber 602. Circulation of the medium may accelerate solubilization of the additive 606 into the three-dimensional printed object 604 at operation 72 below. Thus, the method 60 may circulate the medium within the chamber 602 before and/or concurrent with preceding operation 70 as well as succeeding operation 72.

The method 60 includes, at operation 72, diffusing the additive 606 into the three-dimensional printed object 604 to form an additive-infused three-dimensional printed object 614. Typically, the additive 606 diffuses into the three-dimensional printed object 604 within minutes.

In an exemplary embodiment, the additive 606 diffuses into the three-dimensional printed object 604 in a duration of no more than 500 minutes, such as no more than 400 minutes, no more than 300 minutes, no more than 200 minutes, no more than 150 minutes, no more than 120 minutes, no more than 90 minutes, no more than 60 minutes, no more than 30 minutes, no more than 15 minutes, or no more than 5 minutes. In exemplary embodiments, the additive 606 diffuses into the three-dimensional printed object 604 in a duration of at least one minute, such as at least five minutes, at least ten minutes, at least fifteen minutes, at least thirty minutes, at least forty minutes, at least sixty minutes, at least ninety minutes, or at least 120 minutes. In certain embodiments, the additive 606 diffuses into the three-dimensional printed object 604 in a duration of from one minute to 500 minutes, such as from fifteen to 120 minutes, for example from thirty to sixty minutes, depending on the size of the object and the depth of penetration of the infusion molecule desired.

It is contemplated that increasing the pressure and/or temperature of the chamber 602 may decrease the duration of time needed to diffuse into the three-dimensional printed object 604.

In certain embodiments, the additive 606 diffuses into the three-dimensional printed object 604 completely, such that a cross-section of the additive-infused three-dimensional printed object 614 would exhibit a uniform amount of additive 606 infused at all distances from the object surface. In other embodiments, operation 72 may be performed at conditions and for a duration such that the additive 606 diffuses only partway into the object, i.e., to a certain depth from a surface of the three-dimensional printed object 604.

In exemplary embodiments, after diffusing the additive 606 into the three-dimensional printed object 604, the additive-infused three-dimensional printed object 614 has an additive concentration that is or is less than 10 weight percent (wt. %), 5 weight percent, 4 weight percent, 3 weight percent, 2 weight percent, or 1 weight percent, based on a total weight of the printed object.

In exemplary embodiments, after diffusing the additive 606 into the three-dimensional printed object 604, the additive-infused three-dimensional printed object 614 has an additive concentration that is or is greater than 0.5 weight percent, 1 weight percent, 2 weight percent, 3 weight percent, 4 weight percent, 5 weight percent, or 10 weight percent, based on a total weight of the printed object.

It may be seen from FIGS. 5 and 6, that locating the three-dimensional printed object 604 and the additive 606 in the chamber 602, feeding the medium 608 into the chamber 602, maintaining the conditions in the chamber 602, and solubilizing the additive 606 into the supercritical fluid 618 collectively cause contact of the three-dimensional printed object with the medium in the form of a supercritical fluid to infuse the additive into the three-dimensional printed object 604 to form additive-infused three-dimensional printed object 614.

At operation 74, the method returns the chamber 602 to atmospheric conditions, such as by de-pressurizing or de-pressurizing and cooling the chamber 602. For example, operation 76 may include removing the medium 608 from the chamber 602. Removal of medium 608 causes de-pressurization of the chamber.

The method 60 includes, at operation 78, removing the additive-infused three-dimensional printed object 614 and any remaining additive 616 from the chamber 602. Thereafter, the additive-infused additive manufacturing feed material may be stored or may be transported for use in additive manufacturing.

Thus method 60 forms an additive-infused three-dimensional printed object 614, such that an additive manufacturing technique utilizing such feed material manufactures an additive-infused three-dimensional object of pre-selected characteristics. Such a manufacturing process may eliminate a need for an application of paint or another color-imparting coating.

It is noted that in the above method 60 described in relation to FIGS. 5-6, the medium is at supercritical conditions during infusion. In certain embodiments, the method may be performed differently or be optional. Specifically, in certain embodiments, the medium remains at sub-critical conditions—for example, in a liquid state. In such embodiments, the medium is fed into the chamber at operation 66, and the chamber may be sealed at operation 68. In certain embodiments, the conditions in the chamber may be modified, such as heated to a selected temperature, at operation 68. However, in such embodiments, the liquid medium remains in the liquid state. Thereafter, the method 60 continues with the same operations 70, 71, and 72.

Figure 7:
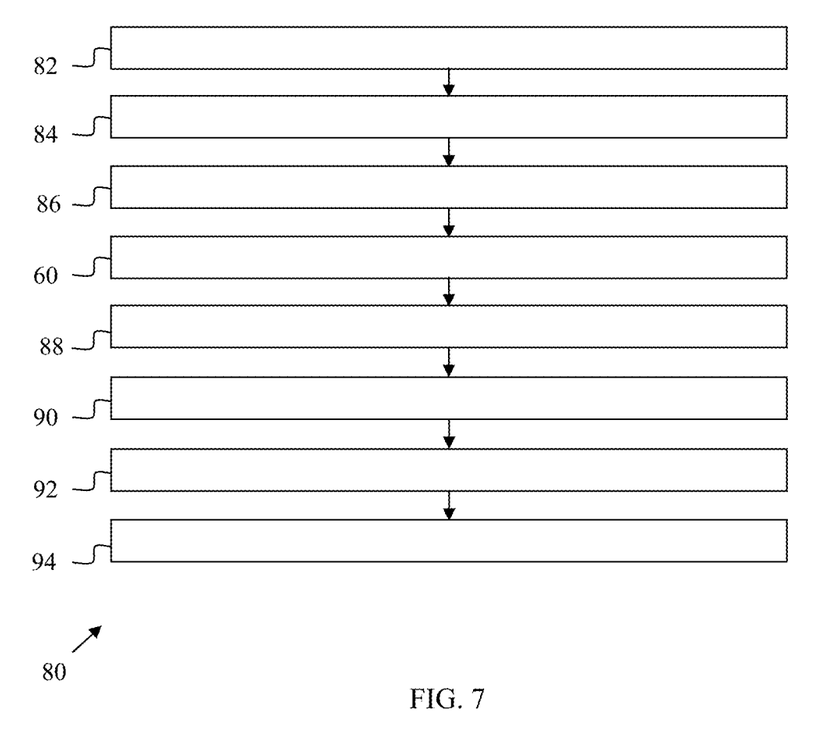
FIG. 7 is a flow chart illustration of a method for manufacturing an additive-infused three-dimensional object, in accordance with various embodiments.
Figure 8:
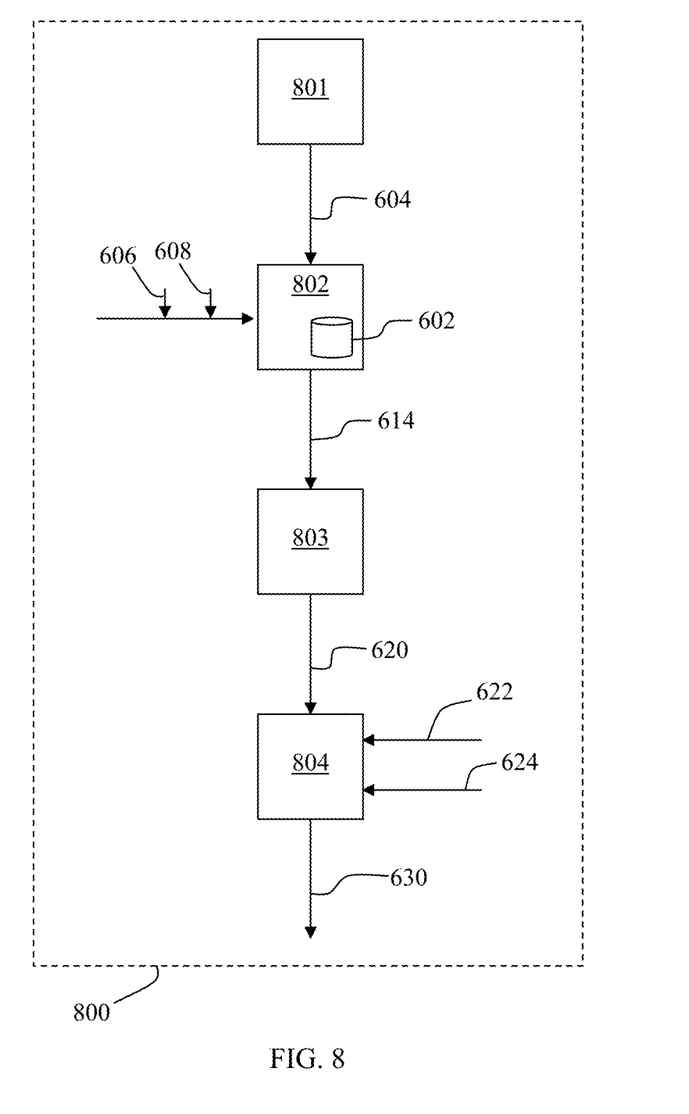
FIG. 8 is a schematic of a method for manufacturing an additive-infused three-dimensional printed object, in accordance with various embodiments.

Referring now to FIGS. 7 and 8, a method 80 is described for manufacturing an assembly from additive-infused three-dimensional printed object 614. Method 80 includes, at operation 82, forming a three-dimensional printed object 604, such as via a three-dimensional printing technique. As shown in FIG. 8, the three-dimensional printed object 604 may be formed in a first work station 801 in a manufacturing plant or factory 800. In certain embodiments, work station 801 may be considered to be work station 402 and use the same inputs and melting/solidifying processes to form the three-dimensional printed object 604.

Further, method 80 includes, at operation 84, storing inputs for use in method 60, e.g., the three-dimensional printed object or objects 604, the additive 606, and the medium 608, in the manufacturing plant 800. More specifically, a plurality of three-dimensional printed objects with selected compositions, shapes, sizes, etc. may be stored in the manufacturing plant 800 such that a desired three-dimensional printed object 604 may be selected for use in method 80 at a particular time. Likewise, a plurality of additives with selected characteristics may be stored in the manufacturing plant 800 such that a desired additive may be selected for use in method 80 at a particular time. Also, a plurality of mediums 608 of selected compositions may be stored in the manufacturing plant 800 such that a desired medium may be selected for use in method 80 at a particular time.

At operation 86, method 80 selects inputs and transports the selected inputs to the second work station 802 in the manufacturing plant 800. Selection and/or selection and transport may be automated and performed by a processor and robot.

As shown, method 80 includes method 60, from FIG. 5, for forming an additive-infused three-dimensional printed object 614 from the selected inputs. For example, method 80 includes, at method 60 and in second work station 802, solubilizing an additive 606 into a medium 608 in the form of a supercritical fluid 618 and contacting the three-dimensional printed object 604 with the medium in the form of a supercritical fluid 618 to infuse the additive 606 into the three-dimensional printed object 604 to form the additive-infused three-dimensional printed object 614.

As shown, chamber 602 is located within second work station 802. Chamber 602 may be permanently located in second work station 802, or may be transported into and out of second work station 802.

After forming the additive-infused three-dimensional printed object 614, method 80 may include, at operation 88, transporting the additive-infused three-dimensional printed object 614 from the second work station 802 to a third work station 403 within the same manufacturing plant 400. In exemplary embodiments, a cart or pod may be used robotically or manually to carry the additive-infused three-dimensional printed object 614 from the second work station 802 to the third work station 803.

At operation 90, the method 80 may optionally include processing the additive-infused three-dimensional printed object 614 to form a processed additive-infused three-dimensional printed object 620.

For example, in certain embodiments, the additive-infused three-dimensional printed object 614 may be processed, such as by an infusion of a second or additional additives. For example, the processing at operation 90 may include a second or additional infusion process for infusing the additive-infused three-dimensional printed object 614 with a second or additional additives. Such processing may be controlled such that the depth of infusion may differ for each additive, as desired.

Method 80 may continue at operation 92, with transporting the processed additive-infused three-dimensional printed object 620 to a fourth work station 804 in the same manufacturing plant 800. In exemplary embodiments, a cart or pod may be used robotically or manually to carry the processed additive-infused three-dimensional printed object 620 from the third work station 803 to a fourth work station 804.

In certain embodiments, the processed additive-infused three-dimensional printed object 620 is an automotive vehicle part. Method 80 may include, at operation 94, assembling the processed additive-infused three-dimensional printed object 620 into a vehicle. For example, the processed additive-infused three-dimensional printed object 620 may be assembled with other processed additive-infused three-dimensional printed object 622 or with other parts 624 to form an assembly 630 for the vehicle.

Method 80 provides for manufacturing a three-dimensional object that is additive-infused such that the object has a consistent profile of additive dispersed throughout the three-dimensional object.

In exemplary embodiments, the processed additive-infused three-dimensional object 620 has a relative additive concentration that is or is less than 100 weight percent (wt. %), 95 wt. %, 90 wt. %, 85 wt. %, 80 wt. %, 75 wt. %, 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, 5 wt. %, 4 wt. %, 3 wt. %, 2 wt. %, or 1 wt. %, based on a total weight of the processed additive-infused three-dimensional object 620.

In exemplary embodiments, the processed additive-infused three-dimensional object 620 has a relative additive concentration that is or is greater than 0.5 wt. %, 1 wt. %, 2 wt. %, 3 wt. %, 4 wt. %, 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. %, based on a total weight of the processed additive-infused three-dimensional object 620.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for forming a function-infused feed material for a three-dimensional printing technique, the method comprising:
   solubilizing a functional additive into a medium, wherein the functional additive is selected from the group consisting of organometallic, electrochromic, and thermochromic additives; and
   contacting a three-dimensional printing feed material with the medium to infuse the functional additive into the three-dimensional printing feed material to form the function-infused feed material.

2. The method of claim 1, wherein:
   solubilizing the functional additive into the medium comprises solubilizing the functional additive into the medium in a liquid state; and
   contacting the three-dimensional printing feed material with the medium to infuse the functional additive into the three-dimensional printing feed material comprises contacting the three-dimensional printing feed material with the medium in the liquid state to infuse the functional additive into the three-dimensional printing feed material to form the function-infused feed material.

3. The method of claim 1, wherein:
solubilizing the functional additive into the medium comprises solubilizing the functional additive into the medium in a supercritical fluid state; and
contacting the three-dimensional printing feed material with the medium to infuse the functional additive into the three-dimensional printing feed material comprises contacting the three-dimensional printing feed material with the medium in the supercritical fluid state to infuse the functional additive into the three-dimensional printing feed material to form the function-infused feed material.

4. The method of claim 3, wherein the method comprises:
locating the functional additive in a chamber;
locating the three-dimensional printing feed material in the chamber;
feeding the medium into the chamber;
maintaining conditions in the chamber such that the medium is in the supercritical fluid state;
solubilizing the functional additive in the medium in the supercritical fluid state;
circulating the medium in the supercritical fluid state within the chamber;
diffusing the functional additive from the medium in the supercritical fluid state into the three-dimensional printing feed material; and
depressurizing the chamber.

5. The method of claim 3, wherein the medium in the supercritical fluid state is supercritical carbon dioxide and, optionally, a co-solvent.

6. The method of claim 1, wherein the three-dimensional printing feed material is polyamide.

7. The method of claim 1, wherein the function-infused feed material has a functional additive concentration of less than about 10 weight percent, based on a total weight of the function-infused feed material.

8. The method of claim 1, wherein the functional additive is an organometallic additive.

9. The method of claim 8, further comprising:
performing a three-dimensional printing process to form a function-infused three-dimensional object from the function-infused feed material.

10. The method of claim 9, further comprising:
performing a heat treatment or reduction process to convert the function-infused three-dimensional object to a metallic form.

11. The method of claim 8, wherein the functional additive is an organometallic complex based on silver and/or copper.

12. The method of claim 1, wherein the functional additive is an electrochromic additive.

13. The method of claim 12, further comprising:
performing a three-dimensional printing process to form a function-infused three-dimensional object from the function-infused feed material, wherein the function-infused three-dimensional object is configured to fluoresce or glow under ultraviolet (UV) light.

14. The method of claim 1, wherein the functional additive is a thermochromic additive.

15. The method of claim 14, further comprising:
performing a three-dimensional printing process to form a function-infused three-dimensional object from the function-infused feed material, wherein the function-infused feed material is configured to change color based on temperature.

16. The method of claim 1, further comprising:
performing a three-dimensional printing process to form a function-infused three-dimensional object from the function-infused feed material.

17. The method of claim 16, wherein the function-infused three-dimensional object is configured to fluoresce or glow under ultraviolet (UV) light.

18. The method of claim 16, wherein the function-infused feed material is configured to change color based on temperature.

19. The method of claim 16, further comprising performing a heat treatment or reduction process to convert the function-infused three-dimensional object to a new form.

* * * * *